United States Patent [19]

Hashizume et al.

[11] Patent Number: 4,899,242

[45] Date of Patent: Feb. 6, 1990

[54] LOCKING MECHANISM OF MAGNETIC TAPE CASSETTE

[75] Inventors: Kenji Hashizume, Nagano; Masaru Ikebe, Komoro; Masatoshi Okamura, Saku; Haruo Shiba, Komoro, all of Japan

[73] Assignee: TDK Corporation, Tokyo, Japan

[21] Appl. No.: 215,833

[22] Filed: Jul. 6, 1988

[30] Foreign Application Priority Data

| Jul. 9, 1987 | [JP] | Japan | 62-104487 |
| Jul. 9, 1987 | [JP] | Japan | 62-104488 |
| Jul. 9, 1987 | [JP] | Japan | 62-104489 |
| Jul. 9, 1987 | [JP] | Japan | 62-104490 |

[51] Int. Cl.4 ............................................. G11B 23/08
[52] U.S. Cl. .................................................... 360/132
[58] Field of Search .................. 360/132; 242/198, 199

[56] References Cited

U.S. PATENT DOCUMENTS

| 4,389,690 | 6/1983 | Oishi et al. | 360/132 |
| 4,589,609 | 5/1986 | Oishi et al. | 360/132 |
| 4,621,297 | 11/1986 | Beyërsbergen van Henegouwen et al. | 360/132 |
| 4,650,136 | 3/1987 | Tsuruta | 360/132 |
| 4,703,384 | 10/1987 | Kawada et al. | 360/132 |
| 4,744,530 | 5/1988 | Cybulski et al. | 360/132 |
| 4,791,504 | 12/1988 | Igarashi et al. | 360/132 |

FOREIGN PATENT DOCUMENTS

| 3150317 | 7/1982 | Fed. Rep. of Germany | 360/132 |
| 57-15263 | 1/1982 | Japan | 360/132 |
| 58-60475 | 4/1983 | Japan | 360/132 |
| 60-258781 | 12/1985 | Japan | 360/132 |

Primary Examiner—John H. Wolff
Assistant Examiner—Matthew J. Bussan
Attorney, Agent, or Firm—Sprung Horn Kramer & Woods

[57] ABSTRACT

A locking mechanism for a front cover of a magnetic tape cassette which occupies only a small space is disclosed.

The locking mechanism comprises a locking lever provided in at least one of the both ends of the cassette case, an elastic member always deflecting the locking lever toward an end plate of the front cover of the cassette case and an achoring member provided in one of end plates of the front cover so as to be engageable with an anchoring click of the locking lever, and the locking lever is slidably guided by a guiding mechanism formed in the cassette case.

5 Claims, 7 Drawing Sheets

LOCKING MECHANISM OF MAGNETIC TAPE CASSETTE

TECHNICAL FIELD OF THE INVENTION

The present invention relates to a magnetic tape cassette, and more particularly to a locking mechanism of a front cover of a magnetic tape cassette.

More specifically, the present invention relates to a locking mechanism which occupies only a small space.

DESCRIPTION OF THE PRIOR ART

A magnetic tape cassette used for VHS video tapes, 8-mm video tapes, DAT tapes and the like consists of a case having a front portion wherefrom a magnetic tape is exposed and a front cover pivotally mounted to the case on both sides of said front portion in order to protect the magnetic tape being exposed in said front portion.

The front cover is closed during the period of non-operation such as during the storage of a cassette, and is opened with pivoting during operation.

The front cover includes a locking mechanism locking said front cover so as not to be carelessly opened by an external force during closing and automatically unlocking by an unlocking pin which makes an inroad from the recorder side when a cassette is mounted into a recorder.

Various types of locking mechanisms have been proposed. A typical one includes, as is seen in VHS video cassettes, an anchoring projection engageable into an anchoring hole in the front cover near a front end of a swinging plate pivotably supported by a bearing or a shaft provided in the case in a direction perpendicular to the shaft of the front cover, said swinging plate being always deflected toward an end plate of the front cover by a spring. When the unlocking pin in the recorder side swings said swinging plate, the anchoring projection is disconnected from the anchoring hole. However, the swinging plate occupies a relatively large space, so that in designing a cassette with a smaller case size and at the same time with a magnetic tape contained therein as long as possible, the swinging plate in the locking mechanism interferes with the running path of the magnetic tape, the guide pin and the like, resulting in the limit of the miniaturization of the cassette. In the VHS-C ( to be used in an illustration of the present invention ) recently put into practice, for example, a hub is used which is so large that it comes very close to or even within the side wall of the case. Hence, a location wherein the locking mechanism can be mounted is limited to near the pivotally-mounted member of the front cover in which portion are also disposed a guide roller, a guide pin and the like, so that a space for the locking mechanism is still more limited.

Another type of locking mechanism has been shown in Utility Model Kokai-Publication No. 51 ( 1976 )-15909. In this example, a locking member is mounted in the case body, perpendicular to a pivot shaft of a front cover so as to be slidable to the direction of the front cover, and is always deflected toward the front cover by a spring. When an unlocking pin in the recorder side making inroad from a base plane of the locking member acts on the slope of the locking member, the locking member is disconnected from an engaging relationship with the front cover. It is necessary to provide the locking member in a location sufficiently rear from the magnetic tape so as not to interfere with the magnetic tape. This has a great influence on the internal structure such that a tape-winding hub can not have a large size, and another influence on a guide pin and the like is also to be considered.

Another method of the same kind has been described in Utility Model Kokai-Publication No. 51 (1976 )-51718. In this example, a locking member is provided along the front member of the case and slides to the direction of the axis of the pivot shaft of the front cover, hence the exposed length of the magnetic tape in the front member of the case is largely limited.

In another method, in order to avoid the complication of the locking mechanism a slidable bar member directly contacts one of the two planes of the front cover perpendicular to each other in accordance with the position of opening and closing of the front cover, and the rear end thereof is pressed by a leaf spring. In this case, the opening and closing of the front cover is performed by a means in the recorder side. However, this method does not provide a locking mechanism, so that there is a disadvantage that the front cover is easily opened with a hand or a small external force during the period of non-operation when a cassette is taken out of the recorder.

OBJECT OF THE INVENTION

It is an object of the present invention to provide a locking mechanism for a front cover in a magnetic tape cassette which occupies only a minimum space. It is a concrete object of the present invention to provide a locking mechanism of a front cover provided with a locking lever easily mountable in a portion within a corner member of a cassette case wherein a tape running path, a tape hub, a guide roller and the like are jammed, without interfering with them.

SUMMARY OF THE INVENTION

The object of the present invention can be attainted by using a locking mechanism with a configuration described below.

That is, a locking mechanism according to the present invention used in a magnetic tape cassette including a cassette case, a front cover openably and closably centering around a rotation axis mounted in a front member thereof and a front cover locking mechanism comprises a locking lever provided in at least one of the both ends of the case and operated by an unlocking means on the recorder side, an elastic member always deflecting said locking lever toward an end plate of the front cover in a direction parallel to said rotation axis and an anchoring member provided in one of end plates of said front cover so as to be engageable with an anchoring click of said locking lever, and said locking lever being slidably guided by a guiding mechanism formed in the cassette case.

In a first preferred embodiment, said locking lever includes a slide member in the form of a tubular member wherein a rear end thereof is open and a part of a lateral wall thereof is notched, said elastic member is received in an inner hole of said tubular member, a rear end thereof is constrained by a holder for the elastic member extending from the case side to a portion rearwardly of the locking lever and when said tubular member is retracted by a releasing means, the holder for the elastic member relatively enters said inner hole along said notch.

In a second preferred embodiment, said cassette case consists of an upper case and a lower case, said slide member of said locking lever includes a portion inserted in a guiding recess provided in one of the cases and guided by a guiding means in said one of the cases and said slide member further includes a portion guided by position-regulating ribs provided in another case.

In a third preferred embodiment, said cassette case consists of an upper case and a lower case, one of said upper and lower cases includes an opening formedin a side wall for projecting a projection of said locking lever so as to be operated by an unlocking means in the recorder side, a holder for the elastic member provided for holding the rear end of said elastic member, a part of a guiding means formed in a boundary portion of the upper and lower cases so as to guide a slide member of said locking lever and a thinned dented groove formed in an inside surface of said side wall extending from a free edge side of said side wall to said opening or window, and another one of said cases includes another portion of a guiding means of said slide member.

In a fourth preferred embodiment, said cassette case consists of an upper case and a lower case, one of said upper and lower cases includes an opening formed in a side wall for projecting a projection of said locking lever so as to be operated by an unlocking means in the recorder side, a holder for the elastic member provided for holding the rear end of said elastic member and a part of a guiding means formed in a boundary portion of the upper and lower cases so as to guide a slide member of said locking lever, another one of said cases includes another portion of a guiding means of said slide member, and said locking lever further includes an inner hole receiving said elastic member and a slot formed in the lateral wall of said slide member for inserting a tool for pushing said elastic member into position.

EFFECT OF THE INVENTION

According to the present invention, a locking mechanism can be mounted in a limited space within a corner member of a cassette case without interfering with other guide roller, tape frange and the like.

According to the first preferred structure of the present invention, the elastic member is received within the tubular member of the locking lever, and at the same time the total thickness of the locking lever having the holder for the elastic member in the notch and the spring can be very small, thus a sufficient locking function can be accomplished within a limited space.

According to the second preferred structure of the present invention, the mounting of the locking member into the cassette case is realized as follows. First, the elastic member and the locking lever are mounted into the recess of the upper case and held in a predetermined position, then, when the lower case is combined, the guiding means and the position-regulating ribs of the both cases stably hold and guide the locking lever. The locking mechanism according to the present invention is easy to assemble. This is because the upper case along can hold the locking lever in a predetermined position for a moment, so that on the occasion of combining the lower case the mounting of the case can be done safely even with vibration or shock to some extent. Furthermore, according to the preferred structure of the present invention, the elastic member is received within the inner hole of the tubular member of the locking lever, and at the same time of total thickness of the locking lever having the holder of the elastic member in the notch and the spring can be very small, thus a sufficient locking function can be accomplished within a limited space.

According to the third preferred structure of the present invention, the mounting of the locking lever into the cassette case is realized as follows. First, the elastic member and the locking lever are combined, then the locking lever is mounted within the recess of one of the cases, e.g. the upper case by sliding the projection of the locking lever along said dented groove provided within the inside surface of the side wall of the case and said projection is inserted into the opening of the side wall, and the elastic member is held down by the holder for the elastic member. Then, when the lower case is combined, the guiding means and the position-regulating ribs of the both cases stably hold and guide the locking lever. According to the present invention, the position of the holder for the elastic member can be close to the side wall, and the rear end of the locking lever can also be close to the side wall during the operation of the mounting of the locking lever and no interference occurs with internal members and the tape running path. In other words, the front cover locking mechanism according to the present invention requires a minimum space and at the same time has fewer interference with other members. Furthermore, according to the preferred structure of the present invention, the elastic member is received within the tubular member of the locking lever, and at the same time the total thickness of the locking lever having the holder of the elastic member in the notch and the elastic member can be very small, thus a sufficient locking function can be accomplished within a limited space.

According to the fourth preferred structure of the present invention, the mounting of the locking lever into the cassette case is realized as follows. First, the elastic member and the locking lever are combined, then the locking lever is mounted within the recess of one of the cases, e.g. the upper case by sliding the projection of the locking lever along said groove provided within the inside surface of the side wall of the case and said projection is inserted into the opening of the side wall, and the elastic member is held down by the holder of the elastic member. Then, when the lower case is combined, the guiding means and the position-regulating ribs of the both cases stably hold and guide the locking lever. According to the present invention, the position of the holder of the elastic member can be close to the side wall, and the rear end of the locking lever can also be close to the side wall during the operation of the mounting of the locking lever and no interference occurs with internal members and the tape running path. In other words, the front cover locking mechanism according to the present invention requires a minimum space and at the same time has fewer interference with other members. Furthermore, according to the structure of the present invention, the elastic member is received within the inner hole of the locking lever, is compressed through a slot for holding the elastic member and can be mounted into a predetermined portion within the case in that condition, so that the mounting of the locking lever can be easily performed without difficulties such as the dislodgement of the elastic member , resulting in the improvement of the operation efficiency.

DESCRIPTION OF PREFERRED EMBODIMENTS

Although embodiments of the present invention will hereinafter be described in detail with regard to the VHS-C-type magnetic tape cassette, it will be apparent that the present invention can be applied to any type of magnetic tape cassette having a front cover.

TOTAL CONFIGURATION

As is shown in the figures, a magnetic tape cassette includes a case 3 wherein an upper case 1 and a lower case 2 are combined at an outer circumference thereof and a front cover 5 pivotally mounted on the both ends of said case 3 ( the upper case 1 in this example ) by pivot pins 7, 7 at a front member 4 of the case 3 and always pressed to the direction of a closed cover by a spring 8. 9 is a transparent window in the upper case 1. Inside the case 3, reels 18 and 19 including respectively lower flanges 12 and 13 having reel hubs 10 and 11 in a body, tape clamps 16 and 17, and upper flanges 14 and 15 are rotatably received, and magnetic tapes ( not shown in the figures ) are wound therearound. The lower flanges 14 and 15 are held down by a leaf spring 20 fixed to the upper case 1. In the lower case 2 a shaft 21 for the reel 18 is provided, and further a circular opening 22 for the reel 19 is provided. In addition, means for combining the upper and lower cases 1 and 2 are provided, but the further explanation will be omitted since they have no relationship with the main subject. In the left corner of the front member 4 of the lower case 2, a pin 23 supporting a guide roller 24, a pin 26 supporting a guide roller 25 and a pin 27 supporting an auxiliary guide roller 28 are provided, and in the right corner thereof a pin 29 supporting a guide roller 30 and a pin 31 supporting a guide roller 32 are provided. The magnetic tape passes from the reel 18 through the guide roller 24, 26 and the front member 4 of the case and via the guide rollers 30, 32 to the reel 19. The auxiliary guide roller 28 acts to guide the tape to the side portion when a tape cassette is mounted in a recorder for VHS utilizing an adapter.

Figure 3:
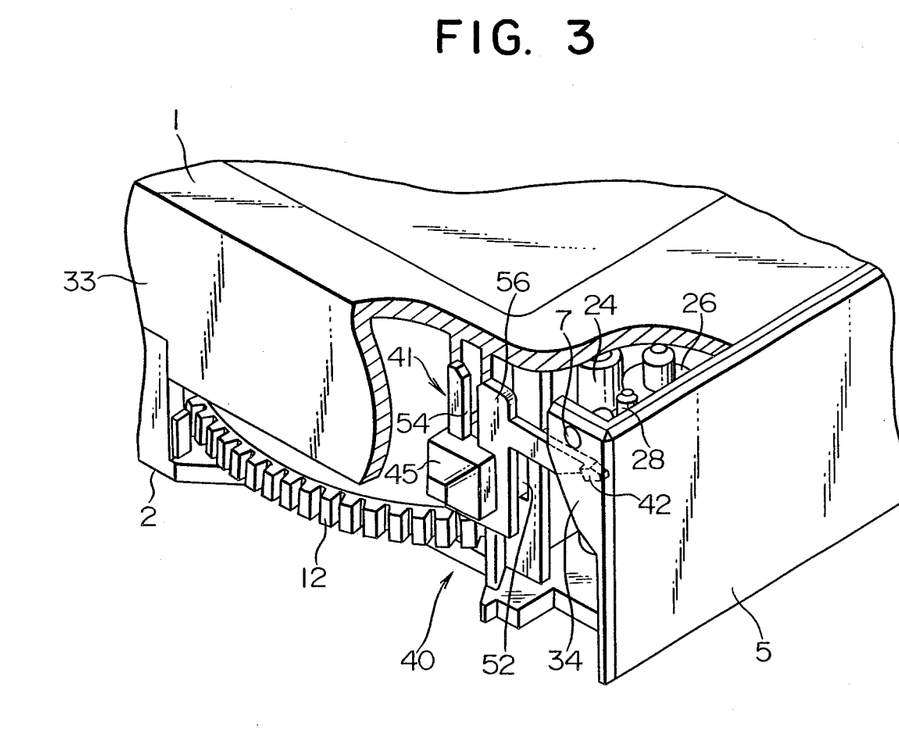
FIG. 3 is an enlarged perspective view, partly in section, of the left front end member of said cassette including a locking mechanism.
Figure 4:
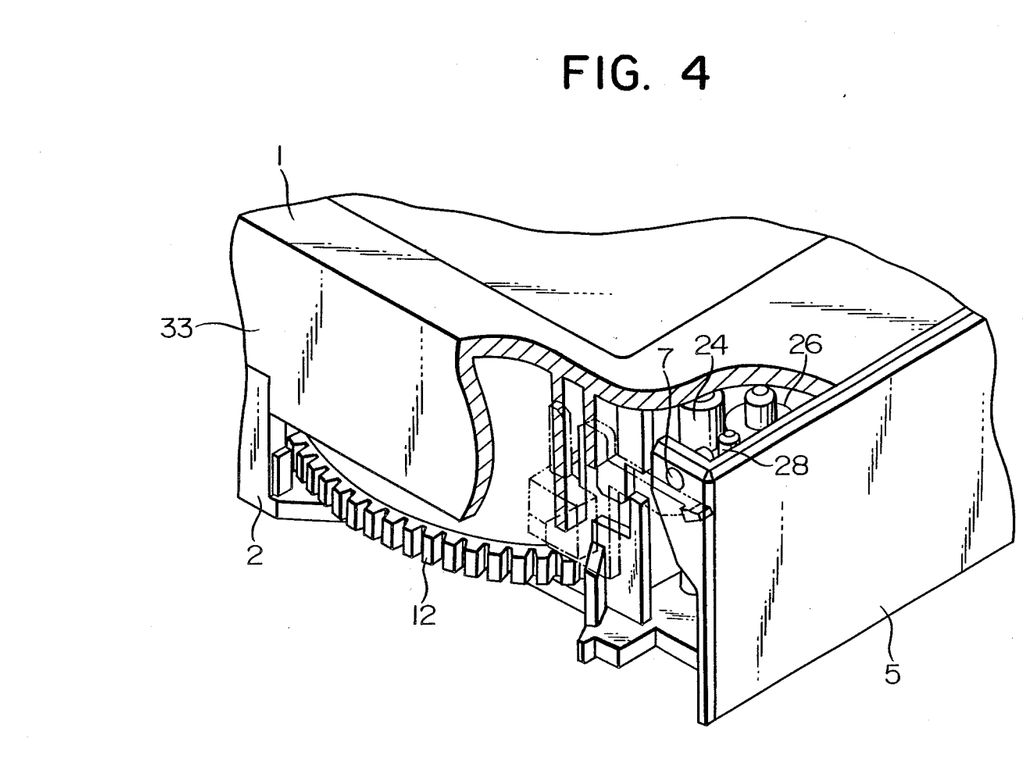
FIG. 4 is a perspective view the same as FIG. 3 illustrating a locking lever with dotted lines.

As is clear from the figures, portions having some room in the front member 4 of the cassette case 3 are corner members in the both left and right ends, but the reel flanges 12,13,14 and 15 are relatively large compared with the case 3 and the lower flange 12 extends to within the thickness of a side wall 33 of the case, so that there are only small rooms in the corner members. In addition, since guide rollers 24, 25 and 26 are provided, the rooms become furthermore smaller, FIGS. 3 and 4 illustrate the conditions in the left corner member. Therefore, there is no room for mounting a conventional slide-type locking mechanism or a conventional swinging-type locking mechanism within this location, thus a thorough improvement is required. A locking mechanism 40 according to the present invention has solved this problem. It will be noted that the locking mechanism 40 has been illustrated as to be provided in the left end of the front member, but it is also possible to provide the same in the right end.

LOCKING MECHANISM

Now, the locking mechanism 40 according to the present invention will be explained with reference to FIGS. 3 and 4 as well as FIGS. 5 through 9. The locking mechanism 40 consists of a locking lever, an anchoring member in the front cover side, locking lever regulating means and guiding means in the upper and lower cases and a compression spring.

Figure 1:
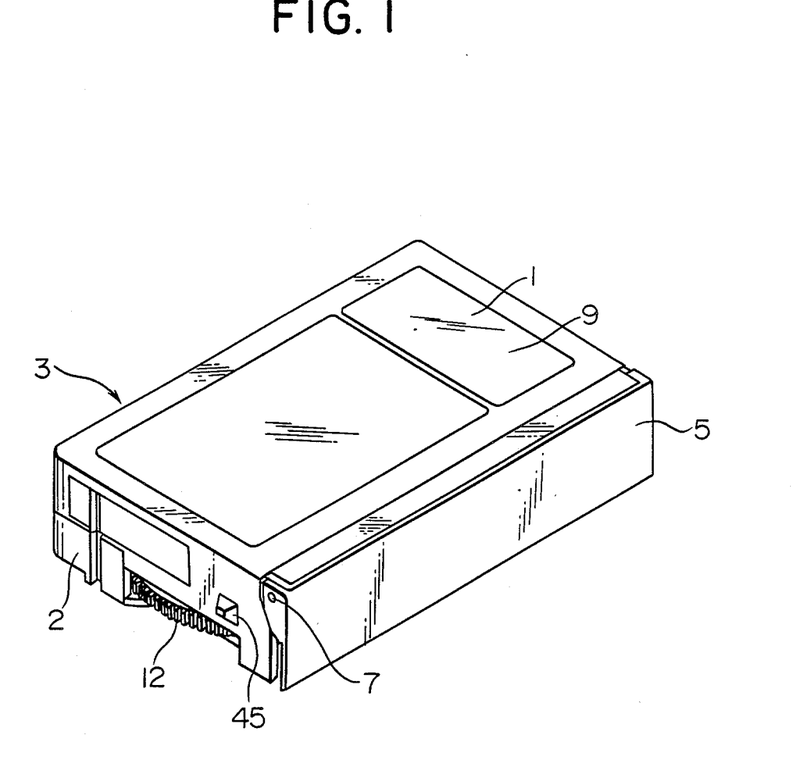
FIG. 1 is a perspective view illustrating an example of a magnetic tape cassette including a locking mechanism according to the present invention.
Figure 2:
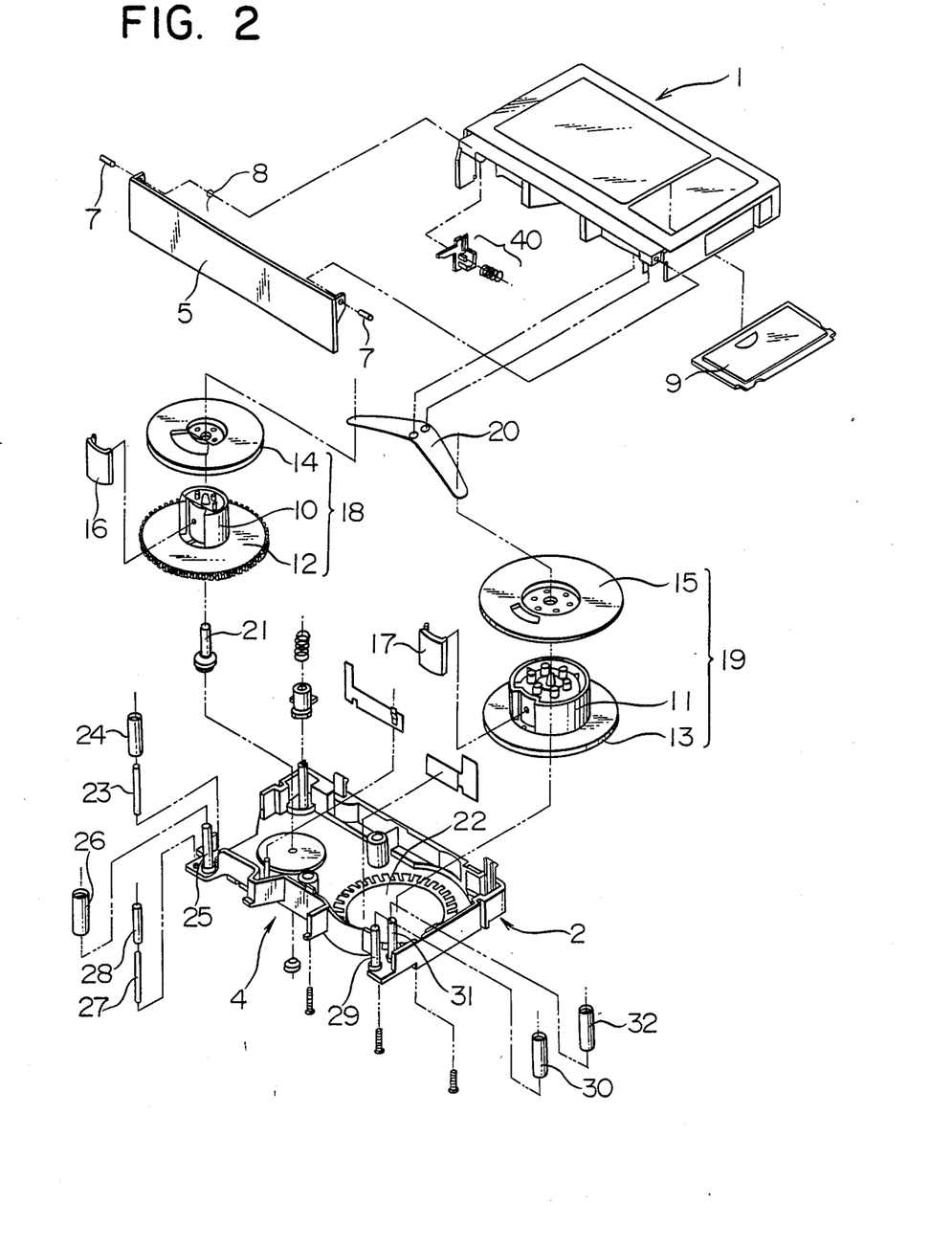
FIG. 2 is an exploded view of the same.
Figure 5:
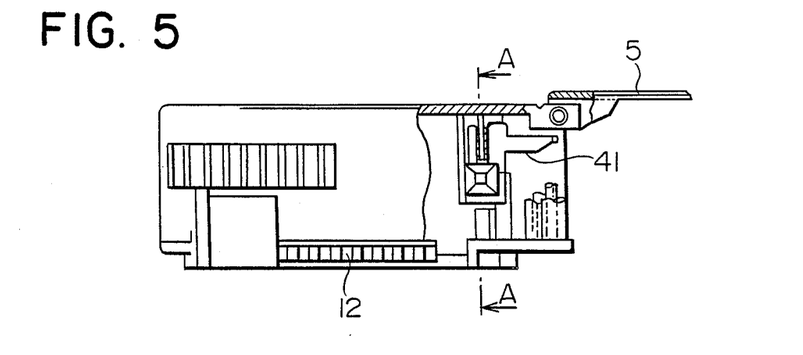
FIG. 5 is a side view of the same with a front cover open.
Figure 7:
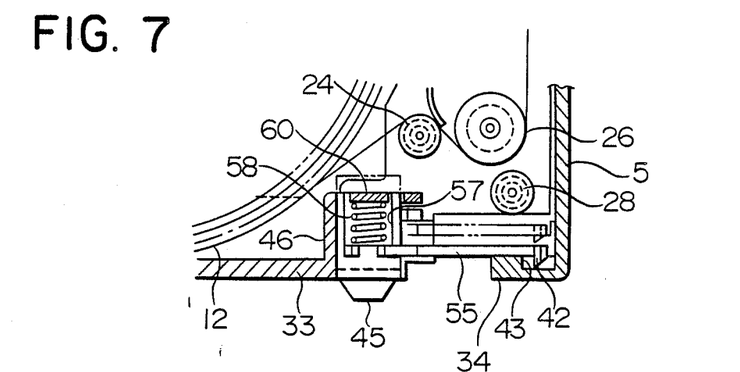
FIG. 7 is a plan crosssectional view of an important portion.

Referring to FIGS. 3,4 and 7, the left end of the front cover 5 includes an end plate 34 ( the circumstance is the same in the right end, but the explanation is omitted here ), by means of a pivot pin 7 provided therein is pivotally mounted to the front end of the side wall 33 of the upper case, and is pivoted between the closed position shown in FIG. 1 and the open position shown in Fig.5. In a part of the inside surface of the end plate 34 is formed a recess which provides an anchoring member 43 ( FIG. 7 ) for an anchoring click of a locking lever 41.

The locking lever 41 includes a projection 45 projecting from an opening 44 in the side wall 33 of the upper case and pressed by an unlocking pin 45' in the recorder side, a tubular member 52 ( square in this example ) extending backward from said projection and making contact with and being guided by a locating wall 46 in the upper case 1 and guiding planes 49 and 50 of a position-regulating rib 47 in the lower case 2, and a supporting plate 56 having an anchoring click 42 via an arm 55 and having a slot 54 fitted with a guide rib 53 in the upper case 1. The forward stroke of the supporting plate 56 is restricted by the inside surface of the side wall 33, and the retreating stroke thereof is limited by the regulating rib 47. Further, the lower plane 62 of the supporting plate 56 is guided by the upper plane 51 of the regulating rib.

In the tubular member 52 of the locking lever 41 is formed an inner hole 57, in which a compression coil spring 58 is received. The compression spring 58, in the free state thereof, protrudes outward from the open end of the inner hole 57 as in FIG. 8. The upper side of the rear portion of the innr hole 57 includes a notch 59 ( FIG. 7 ), a spring holder 60 extending downward from the upper case 1 runs thereinto and holds a rear end of the compression spring 58. The tubular member 52 also has a horizontal slot 61. In mounting the locking lever 41, the compression spring 58 is held down with a thin jig which is put into the slot 61 for compressing the spring, and the assembly is accomplished by pushing the locking lever into a predetermined location within the upper case 1 under such a condition. by this way an easy and prompt assembly can be realized.

LOCKING LEVER GUIDING AND REGULATING MEANS

Although it has already been summarized, the guiding and the direction and position regulations of the locking lever 41 are shared by the upper case 1 and the lower case 2. The three planar sides of the square tubular member 52 in the locking lever except the side having the notch 59 become slide planes, and the vertical slot 54 in the upper side of the supporting plate 56 also becomes a slide plane. Further, if necessary, a base plane 62 of the supporting plate also becomes a slide plane. The tubular member 52 and the supporting plate 56, therefore, constitute together a slide member.

In the upper case, both a locating wall 46 and a guide rib 53 extend in a direction perpendicular to the side wall 33. Hence, when the locking lever 41 is mounted within the upper case 1 as illustrated by an arrow, one plane of the tubular member 52 of the locking lever contacts and is guided by the wall 46, and the slot 54 fits the guide rib 53 and is guided to the direction of the axis of the tubular member as well as regulates so that the direction of the arm 55 does not change.

One of the position regulating ribs 47 and 48 provided in the lower case 2, is a planar plate extending parallel to the side wall 33, a horizontal plane 49 and a vertical plane 50 of which guide the sliding of the other two sides of the tubular member 52 as well as act as rear stoppers for the supporting plate 56. Another position regulating rib 48 inclines with regard to the side wall 33, and includes a horizontal plane 51 contacting the base plane of the supporting plate 56. The inclination of the rib 48 comes from the restriction in structure, and may better be perpendicular to the side wall 33.

Thus, the locking lever 41, though the length thereof is short, is stably and reliably guided and at the same time regulated on the direction thereof by the three planes of the tubular member 52, the base plane and slot of the supporting plate 56, so that a reliable locking action and slide action can be secured. Further, in the configuration described above, the locking lever 41 is first mounted within the upper case, wherein a stable temporary holding of the locking lever becomes possible by the cooperative action of the guide rib 53, the locating wall 46, the opening 44 and th spring holder 60.

Figure 8:
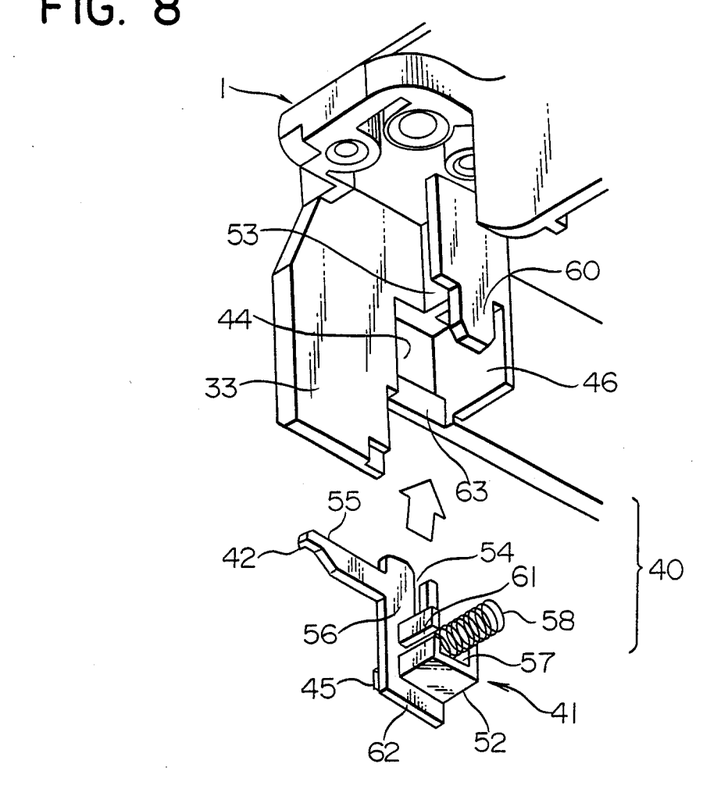
FIG. 8 is a perspective view of an upper case and a locking lever.
Figure 9:
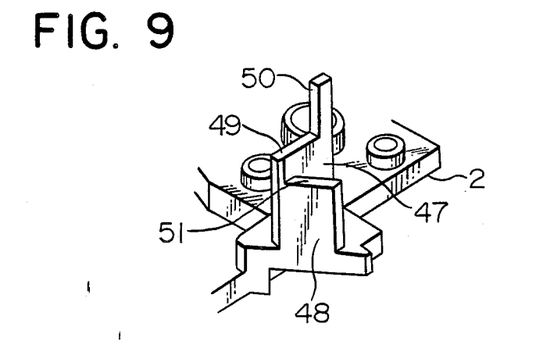
FIG. 9 is a perspective view of a locking mechanism in the lower case side.

As shown in FIG. 8, the lower side of the opening 44 provided in the side wall 33 of the upper case includes a thinned dented groove 63 in the inside surface of the side wall so as to be thinner than other portion of the side wall. This dented groove gives a relief for the projection 45 to slide therein, when the locking lever 41 is mounted into the guiding and supporting structure of the locking lever formed by the locating wall 46, the guide rib 53 and the opening 44 of the upper case. By using this relief, the guiding and regulating structure of the locking lever becomes small size, and the position of the rear end during the retreat of the locking lever becomes closer to the side wall 33, resulting in the saving of the space.

Figure 10:
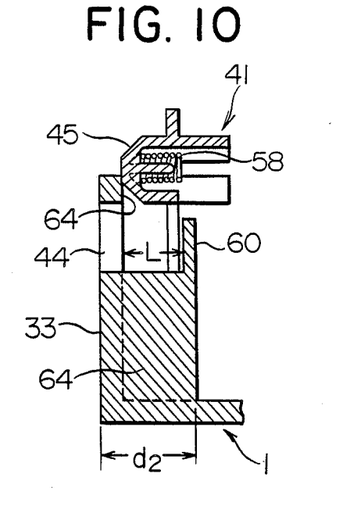
FIG. 10 is a cross-sectional view illustrating the assembly of a locking lever according to a comparative example.

This item will be explained in detail with reference to a comparative example in FIG. 10 and examples according to the present invention in FIGS. 11 and 12. In FIG. 10, in inserting the locking lever 41 into a predetermined recess in the upper case 1, in order to insert the compression spring 58 into said recess with pushing down the spring in the inside of the locking lever by a tweezer and the like, the spring holder 60 should be in a position 1 farther than the distance from the front end of the projection 45 of the locking lever to the front end of the notch 59 ( or the rear end of the spring when the compressed spring is longer ) measured from the inner plane 64 of the side wall 33. Hence, the thickness $d_1$ up to the spring holder 60 becomes thick. Furthermore, the projected length of the rear end of the locking lever 41 during the assembly operation becomes long, resulting in the increase of the degree of interference with surrounding members.

Figure 11:
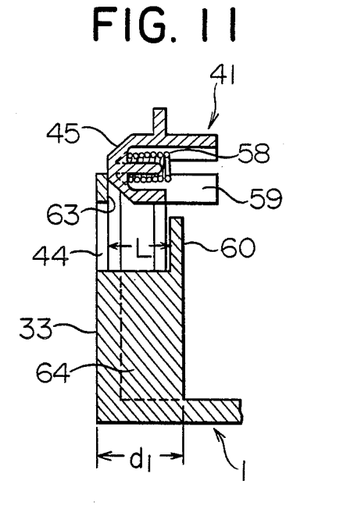
FIG. 11 is a crosssectional view illustrating the assembly of a locking lever according to the present invention and FIG. 12 is a cross-sectional view illustrating a condition after the assembly wherein the upper and lower cases have been combined.
Figure 12:
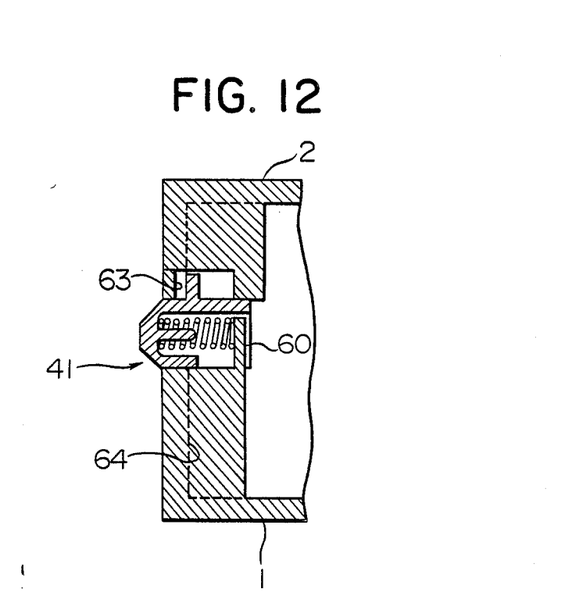

On the contrary, as the dented groove 63 is formed in the inner plane 64 of the side wall as in FIGS. 11 and 12 according to the present invention, the position of the spring holder 60 may be at a position 1 measured from the plane of the groove 63, hence the spring holder 60 is located at $d_2$ which is smaller than $d_1$. Further, the backward-projected length of the locking lever 41 during the assembly operation becomes shorter, resulting in the decrease of the interference with surrounding members.

ADVANTAGES OF THE INVENTION

Figure 6:
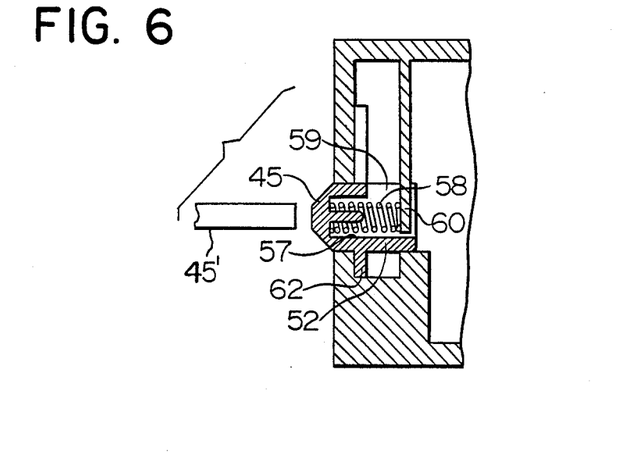
FIG. 6 is a crosssectional view of the line A-A in FIG. 5.

As in FIGS. 8 and 10, the compression spring 58 is mounted within the locking lever, and the the spring 58 is pushed in and compressed through the slot 61 by a jig such as a tweezer. Thus, the compression spring is stably held in the inner hole 57. Then, the locking lever is in that condition pushed into a space surrounded by the spring holder 60, the location wall 46 and the side wall 33 as illustrated by an arrow. At this moment, the slot 54 in the upper end side of the supporting plate 56 fits the guide rib 53. The projection 45, if pushed in to the end, fits the opening 44 in the side wall 33 and is exposed outward. The rear end of the spring 58 is held down by the spring holder 60 making inroad in the open end of the inner hole in the tubular member 52 of the locking lever ( See FIGS. 6 and 7 ). It will be noted that from a standpoint of space saving the spring holder 60 preferably projects in the inner hole of the tubular member 52 as shown in FIGS. 6 and 7, but the effect of space saving can also be realized even if it is somewhat in the outside and enters the inner hole when the locking lever 41 retreats by the unlocking pin 45' of the recorder. Then, when the lower case 2 is combined with the upper case 1, the planes 49, 50 and 51 of the position regulating ribs 47 and 48 respectively contact the plane of the rubular member 62 of the locking lever and the plane 57 of the supporting plate 56 to perform a reliable support and guide of the locking lever.

The conditions in which the locking lever is thus mounted are shown in FIGS. 1, 3, 5 and 9, the conditions in which the front cover 5 is closed and locked by the locking mechanism are shown in FIGS. 1, 3, 6 and 7, and the condition in which the front cover is released and open is shown in FIG. 5.

Now, when the unlocking pin of the recorder side acts and pushes the projection 45 of the locking lever 41, the locking lever retreats to a position shown with chain lines in FIG. 7, and the anchoring click 42 thereof is disconnected from the anchoring member 43 of the front cover end plate 34. The front cover is released by a means in the recorder side. On the contrary, when the front cover 5 is pushed to the closed position by a torsion spring 8 from the condition in FIG. 5, the locking automatically operates to lock the front cover.

When the locking lever retreats from the conditions in Figs. 6 and 7, the spring holder 60 stays only within the inner hole of the tubular member 52, or mostly within the inner hole. Hence, a space occupied by the compression spring 58 and the spring holder 60 almost coincides with a space occupied by the locking lever itself. Thus, according to the present invention a sufficient function can be obtained even with a very limited space, resulting in a great advantage.

Furthermore, according to the present invention, there is another advantage that the arm 55 and the anchoring click 42 in the front end thereof can be stably supported and guided, due to the contact and regulating relationship between the slot 54 and the guide rib 53, the tubular member 52 and the locating wall 46 as well as the regulating rib 47, and the supporting plate 56 and the projection 45.

In addition, the locking lever is temporary held at a predetermined position only by the upper case, so that a stable mounting of other members and a stable combination with the lower case become possible even with vibration or shock to some extent.

Further, according to the present invention, the dimensions of the locking mechanism are reduced, and at the same time the projected length of the locking lever during the assembly operation thereof is reduced, so that the interference with other members can be prevented.

We claim:

1. A front cover locking mechanism in a magnetic tape cassette to be used in a recorder, comprising a cassette case having a front portion having opposite lateral ends, a front cover provided with end plates juxtaposed with the respective lateral ends of said case, said front cover being pivotally mounted on said lateral ends of said front portion of the case at said end plates for opening and closing said front portion of the cassette case and a front cover locking mechanism, said front cover locking mechanism including a locking lever slidably mounted in at least one of the said lateral ends of said case, a compression coil spring for biasing the locking lever and an anchoring means provided in said end plate, said locking lever comprising an elongated slide member slidably guided by a guiding mechanism formed in said lateral end of the cassette case, a free end engageable by an unlocking means in the recorder to unlock the locking lever and an anchoring click facing the end plate of said front plate and adapted to engage the anchoring means of said end plate under the action of said compression coil spring, which normally biases said locking lever toward the end plate.

2. A locking mechanism according to claim 1, wherein said slide member of said locking lever is in the form of a tubular member open at the end opposite to the free end and a side wall of said tubular member has a notch extending in the sliding direction of said slide member, said compression coiled spring is received in an inner hole of said tubular member, a holder is fixedly provided on the case to constrain an outer end of the coiled spring extending outwardly from the open end of the inner hole, said holder is adapted to enter the inner hole from the open end and the slot when said tubular member is urged by the unlocking means against the action of the compression coiled spring.

3. A locking mechanism according to claim 1, wherein said cassette case comprises an upper case and a lower case, said slide member of said locking lever has a portion slidably received in a guiding recess formed in one of the upper and lower case and another portion slidably held and guided by a position-guiding rib provided in the other case of the upper and lower cases, said guiding recess and said rib comprising said guiding mechanism.

4. A locking mechanism according to claim 1, wherein said cassette case comprises of an upper case and a lower case, one of said upper and lower cases includes an opening in a side wall in at least one of said lateral ends for projecting said free end of said locking lever so as to be operated by the unlocking means, a holder is fixedly provided on the case to constrain one end of the compression coiled spring, a part of the guiding mechanism is formed in a boundary portion of the upper and lower cases so as to guide the slide member of the locking lever, and said side wall has a dented groove in its inner surface extending from a free edge of said side wall at the boundary to the opening, and the other case includes the other portion of the guide mechanism for said slide member.

5. A locking mechanism according to claim 1, wherein said cassette case comprises an upper case and a lower case, one of said upper and lower cases includes an opening in a side wall in at least one of said lateral ends for projecting said free end of said locking lever so as to be operated by the unlocking means, a holder is fixedly provided on the case to constrain one end of the compression coiled spring, a part of the guiding mechanism is formed in a boundary portion of the upper and lower cases so as to guide the slide member of the locking lever, and said side wall has a dented groove in its inner surface extending from a free edge of the side wall at the boundary to the opening, and the other case includes the other portion of the guide mechanism for said slide member, and said slide member of said locking lever is in the form of a tubular member open at the end opposite to the free end of said locking lever and a side wall of said tubular member has a slot extending in the slide member for insering a tool for pushing said compression coiled spring.

* * * * *